June 17, 1952     W. P. SCHMITTER     2,600,697
SANITARY GEAR AND MOTOR

Filed April 28, 1949     2 SHEETS—SHEET 1

INVENTOR.
WALTER P. SCHMITTER
BY
Miles Henninger
ATTORNEY

INVENTOR.
WALTER P. SCHMITTER
BY Miles Henninger
ATTORNEY

Patented June 17, 1952

2,600,697

UNITED STATES PATENT OFFICE 2,600,697

SANITARY GEAR AND MOTOR

Walter P. Schmitter, Milwaukee, Wis., assignor to The Falk Corporation, Milwaukee, Wis., a corporation of Wisconsin Application April 28, 1949, Serial No. 90,105

7 Claims. (Cl. 74—421)

This invention relates to improvements in gear and motor combinations particularly for use in the food industry and the like where it is essential that the exterior surfaces of such combinations be kept sanitary at all times.

It is one object of the present invention to provide a gear and motor combination in which both the gear assembly and the motor are so enclosed and mounted as to be readily kept sanitary at all times and with the minimum of effort.

Another object of the invention is to provide a gear and motor unit in which both the gear assembly and the motor are completely protected from splashing and in which the motor is overhung from the gear assembly to avoid damage thereto even if the combination as a whole should be partially immersed in water.

Another object of the invention is to provide a gearing and motor combination in which all parts of the gear assembly and of the motor are securely sealed to prevent either the escape of lubricant from or the ingress of liquid or solids into either the gearing or the motor, but in which the structure is readily assembled and disassembled without the use of special tools.

Objects and advantages other than those above set forth will be apparent from the following description when read in connection with the accompanying drawing in which.

Figure 1:
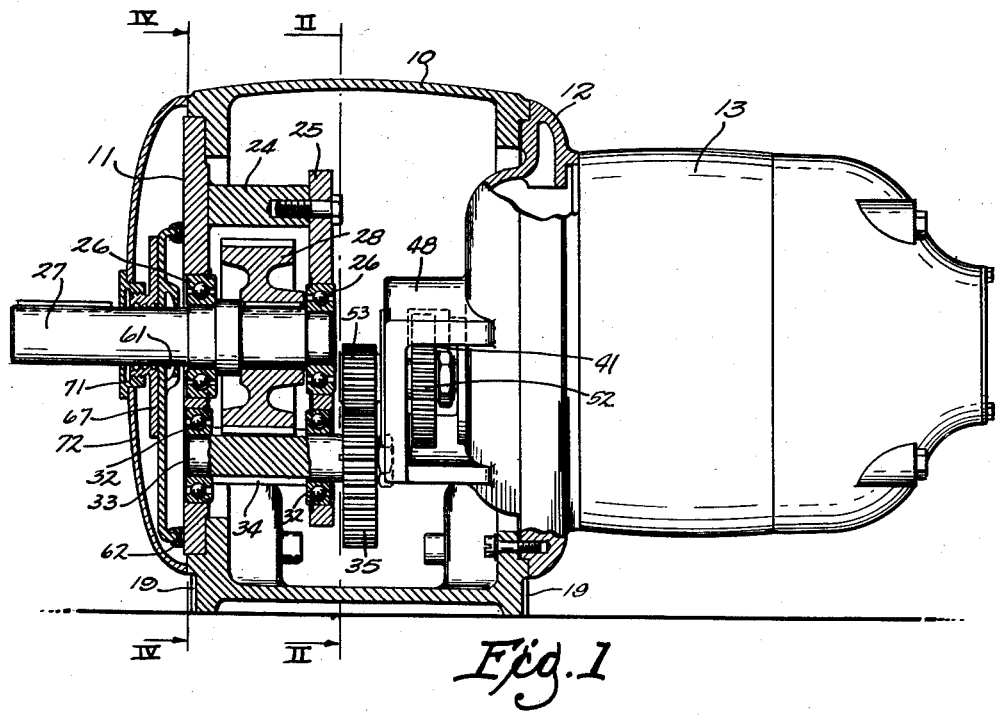
Fig. 1 is a view partially in vertical section on substantially a longitudinal central plane of a gear assembly and partially in elevation of such assembly, and in elevation of a motor supported thereon.
Figure 2:
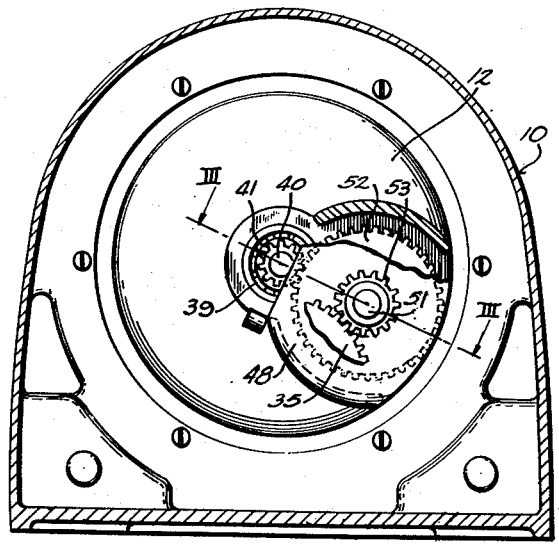
Fig. 2 is a transverse cross-section on the plane of line II—II of Fig. 1.

Generally, the present invention provides a combined gear set and motor in which the gear set has a base for mounting on a foundation and in which the motor extends laterally from and is supported only by the gear set housing and in spaced relation above the foundation. One end wall of the gear set housing and one end bell of the motor frame are common to both the gear set and the motor, and such common portion carries a bracket on which some of the gears are mounted. The common wall is mounted on a shell forming a portion of the gear housing, by screws readily accessible through the shell before the second housing end wall and the remainder of the gearing mounted thereon, are attached to the shell.

The gear set shafts extending through the second end wall of the gear housing, are securely sealed against leakage of liquid either into or out of the gear housing. The motor shaft is provided with special sealing means preventing the splashing of lubricant from the gearing into the motor or even the passage of material amounts of vapor along the motor shaft, and such seal drains to the gear housing.

The external surfaces of both the gear set and the motor are formed to present the minimum of protuberances and edges, the foundation bolts are enclosed and the gear set sealing means is covered, both to provide a unit which will not be affected by water splashing or even partial immersion in water and which can be readily kept completely sanitary.

Referring to the drawings in which like reference numerals refer to like parts, 10 designates a shell on which are to be mounted end plates generally designated 11 and 12, to form an enclosure for a gearing assembly, the end plate 12 also forming one end plate or bell of an electric motor designated 13. Shell 10 has pockets 17 formed therein adjacent the four corners of a base surface thereof to receive bolts 18 by which the gear set and the motor are fixed on the foundation and such pockets are closed by covers 19 fastened to the shell by screws 20. The shell thus has a smooth contour with no openings in which dirt or water may lodge.

Figure 3:
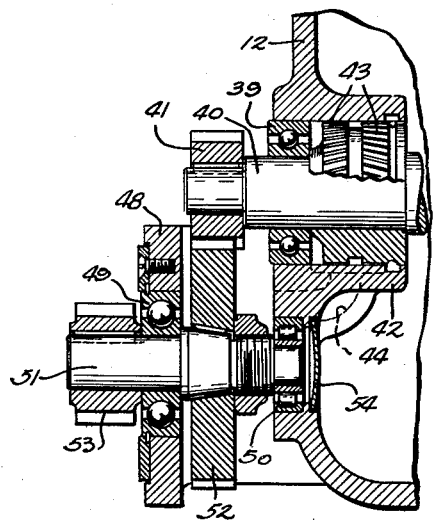
Fig. 3 is a cross-section on the plane of line III—III of Fig. 2.

End plate 11 has fixed thereto spacers 24 on which a plate 25 is removably mounted and the end plate 11 and plate 25 have alined sets of openings to receive bearings. Bearings 26 support a shaft 27 extending through the gear head housing end wall 11 and having a gear 28 mounted thereon. Bearings 32 support a shaft 33 on which are fixed a gear 34 between the housing end wall 11 and the support plate 25, and a gear 35 beyond the plate 25. Housing end wall 12 is apertured (see Fig. 3) to receive bearings 39 supporting a motor shaft 40 and a gear 41 fixed thereon, the wall aperture having a substantially cylindrical extension 42 forming a passage through which the shaft 40 extends. The shaft 40 is formed with flanges 43 spaced relative to one another axially of the shaft and fitting closely into extensions 42. The flanges are formed with peripheral grooves at an angle to the shaft axis for preventing the creepage or seepage of lubricant into the motor. The space between the motor shaft flanges 43 is connected by a passage 44 with the gear housing to return thereto any lubricant entering such space.

A bracket 48 is fixed on the housing end wall 12 and has an opening alined with an opening in such end wall, to receive a bearing 49 coacting with a bearing 50 in the end wall, for supporting a shaft 51 on which are mounted the gears 52 and 53. Gear 52 meshes with gear 41 and gear 53 meshes with gear 35 (see Fig. 1). Bearing 50 is sealed against leakage of lubricant therethrough into the motor, by the Welch plug 54.

Figure 7:
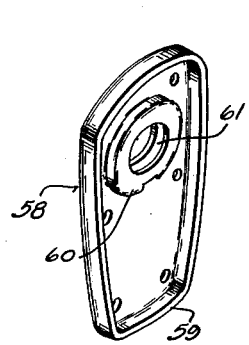
Fig. 7 is a perspective view of one of the parts illustrated in Figs. 1, 4 and 6.
Figure 5:
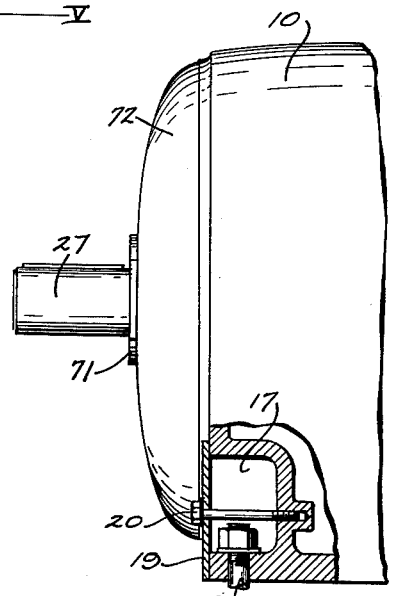
Fig. 5 is a fragmentary cross-section on the plane of line V—V of Fig. 4.

Bearings 26 and 32 in the gear housing end wall 11 must be sealed to prevent the escape of lubricant from the gear housing and to minimize the possibility of water leakage into the housing. It is also desirable that the seal means be so enclosed as to present a rounded surface which is readily cleaned. In the present structure, a seal plate 58 (see Fig. 7) is formed with the edge flanged as at 59 and with an apertured boss 60 within the flange 59 and through which the gearing shaft 27 extends. Such boss has an internal groove indicated at 61 to provide a channel for the collection of lubricant creeping along the shaft 27 and an aperture discharging the lubricant from the groove. The edge flange 59 seats in a gasket 62 of resilient material resistant to lubricant, which is pressed on the housing end wall 11 to provide a tight closure.

Figure 4:
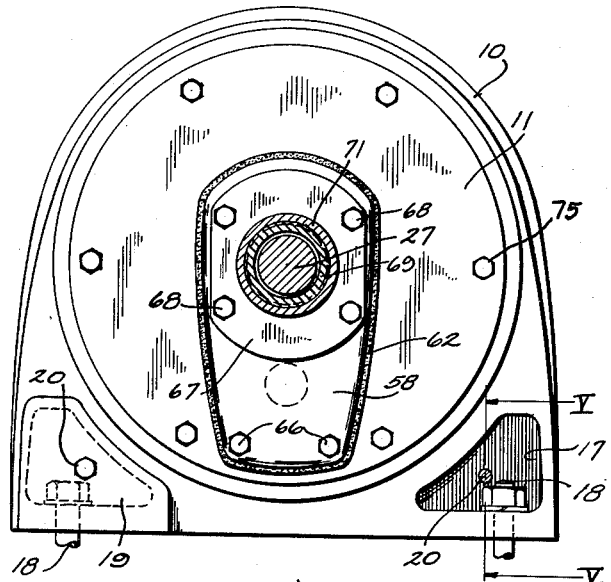
Fig. 4 is a transverse cross-section on the plane of line IV—IV of Fig. 1.
Figure 6:
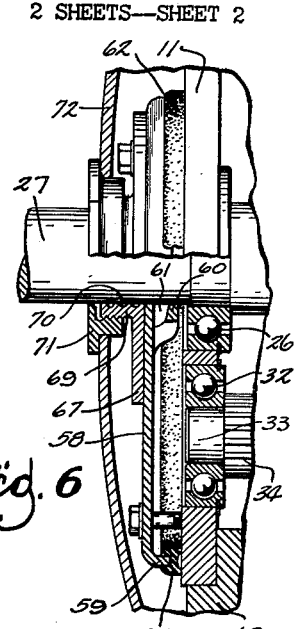
Fig. 6 is a fragmentary view partially in elevation and partially in section of the output drive shaft end of the gear assembly.

Seal plate 58 is fixed to the housing end wall 11 by screws 66 (see Fig. 4) and a tension plate 67 is fastened to the sealing plate by screws 68. Such tension plate is formed with an apertured boss 69 (see Figs. 1 and 6) which is externally threaded. Such boss 69 is internally grooved as at 70 to insure against entrance of water into the gear set even though a jet of water happens to strike the shaft 27 adjacent tension plate 67. A nut 71 may be threaded on the boss 69 to engage a smooth surfaced and dished cover 72 which incloses the seal plate and all of the parts described immediately above excepting the head of the nut, and which also covers the heads of all the screws 75 by which the housing end wall 11 is held on the housing shell 10.

It will thus be seen that the gear set and motor combination of the present invention has external surfaces with the minimum of protuberances or edges which might be difficult to keep entirely sanitary. All parts performing strictly mechanical functions are enclosed, but, in spite of such enclosure, there is no particular difficulty in the manufacture and assembly of the structure and the structure is readily maintained by the use of ordinary tools. The entire device is so sealed and enclosed as to be impervious to water splashing and as to be unaffected even if a material quantity of water should stand around the unit. Some parts of the structure perform a number of functions, being common to both the gear set and the motor.

Although but one embodiment of the present invention has been illustrated and described, it will be apparent that various changes and modifications may be made therein without departing from the invention as defined in the appended claims.

I claim:

1. In a gear assembly, a housing comprising a shell and end plates, a shaft extending through one of the end plates, a seal plate mounted on the end plate for sealing about the shaft, and a cover for the end plate and the seal plate and attached to the seal plate for retention on the shell, the housing and the cover presenting substantially smooth and rounded exterior surfaces.

2. In a gear assembly, a housing comprising a shell and end plates, a shaft extending through one of the end plates, a seal plate mounted on the end plate for sealing the space in the end wall about the shaft, a plate mounted on the seal plate and having a threaded portion about the shaft, a cover for the end plate and the seal, and a nut engaging the threaded plate and the cover for pressing the cover on the shell.

3. In a gearing assembly to be bolted to a foundation, a housing comprising a shell having a base surface and pockets formed therein adjacent the corners thereof, end plates closing the shell, a shaft extending through one of the end plates, a seal plate mounted on the end plate for sealing about the shaft, a cover for the end plate and the seal plate and attached to the seal plate for retention on the shell, and cover plates for the shell pockets, the cover and the cover plates preventing access of water to the parts covered thereby.

4. In a gear set and electric motor combination, a gear set comprising a shell with the rounded upper and side exterior surfaces and with internal flanges adjacent the ends thereof, end plates severally fixed on the shell flanges and formed with brackets extending severally from one side of the plates, and a gear train comprising groups of gears, the groups being severally and wholly supported on the end plates and the brackets thereon.

5. In a gear set and electric motor combination, a gear set comprising a shell with the rounded upper and side exterior surfaces and with internal flanges adjacent the ends thereof, end plates severally fixed on the shell flanges and formed with brackets extending from adjacent sides of the end plates when the plates are fixed on the shell flanges, and a gear train comprising groups of gears, the groups being severally and wholly supported on the plates and the brackets thereon.

6. In a gear set and electric motor combination, a gear set comprising a shell with the rounded upper and side exterior surfaces and with internal flanges adjacent the ends thereof, end plates severally fixed on the shell flanges, one of the end plates forming a portion of the motor frame and having a substantially spherical surface merging into the frame, a gear train comprising groups of gears, the groups being severally and wholly supported on the plates, and a cover enclosing one of the end plates, the cover being substantially spherical and merging into the shell cylindrical surface.

7. In a gear set and electric motor combination, a gear set comprising a shell with exteriorly rounded top and side wall portions and a flattened bottom wall portion and with internal flanges adjacent the ends thereof, the shell having sealed pockets formed on the inside surface thereof and between the flanges, end plates severally fixed on the shell flanges and with brackets extending from adjacent sides of the plates when the plates are fixed on the shell flanges, one of the plates forming a portion of the motor frame and having a substantially spherical surface merging into the frame, a gear train comprising groups of gears, the groups being severally and wholly supported on the end plates and brackets thereof, and a cover enclosing one of the end plates, the cover being substantially spherical and merging into the shell rounded surfaces upon threaded attachment of the cover to the enclosed end plate.

WALTER P. SCHMITTER.

REFERENCES CITED

The following references are of record in the file of this patent:

UNITED STATES PATENTS

| Number | Name | Date |
|---|---|---|
| 1,391,293 | Balough | Sept. 20, 1921 |
| 1,728,279 | Ramsey | Sept. 17, 1929 |
| 1,821,895 | Owens | Sept. 1, 1931 |
| 1,971,968 | Schmitter | Aug. 28, 1934 |
| 2,036,389 | Bannan | Apr. 7, 1936 |
| 2,152,607 | Schmitter et al. | Mar. 28, 1939 |
| 2,170,548 | Christian | Aug. 22, 1939 |
| 2,257,747 | Jones, Jr. | Oct. 7, 1941 |
| 2,503,027 | Christian | Apr. 4, 1950 |

FOREIGN PATENTS

| Number | Country | Date |
|---|---|---|
| 576,436 | Germany | Apr. 27, 1933 |